US008033816B2

(12) United States Patent
Correia

(10) Patent No.: US 8,033,816 B2
(45) Date of Patent: Oct. 11, 2011

(54) APPARATUS AND METHOD FOR MAKING COBBLE-LIKE BLOCKS

(75) Inventor: Horacio Correia, Terrebonne (CA)

(73) Assignee: Rinox Inc., Terrebonne (CA)

( * ) Notice: Subject to any disclaimer, the term of this patent is extended or adjusted under 35 U.S.C. 154(b) by 1300 days.

(21) Appl. No.: 11/551,108

(22) Filed: Oct. 19, 2006

(65) Prior Publication Data

US 2007/0090573 A1 Apr. 26, 2007

(30) Foreign Application Priority Data

Oct. 20, 2005 (CA) ...................................... 2523928

(51) Int. Cl.
*A01J 21/00* (2006.01)
*A23G 9/00* (2006.01)

(52) U.S. Cl. ..... 425/440; 425/218; 425/219; 425/436 R; 249/66.1; 249/120; 249/127; 141/125

(58) Field of Classification Search .............. 141/1, 121, 141/125, 126, 129; 425/117, 135, 145, 147, 425/218, 219, 436 R, 439, 440, 447; 264/46.4, 264/46.5, 46.8, 313, 333–335, 338; 249/66.1, 249/127, 120
See application file for complete search history.

(56) References Cited

U.S. PATENT DOCUMENTS

| | | | | |
|---|---|---|---|---|
| 1,695,327 | A * | 12/1928 | Goldston | 425/217 |
| 3,107,410 | A * | 10/1963 | Davis | 425/159 |
| 3,576,930 | A * | 4/1971 | Watters et al. | 264/45.2 |
| 3,701,228 | A | 10/1972 | Taylor | |
| 3,740,910 | A | 6/1973 | Taylor | |
| 4,164,598 | A | 8/1979 | Wilhelm | |
| 4,183,188 | A | 1/1980 | Goldsby | |
| 4,218,496 | A | 8/1980 | Savignac | |
| 4,275,540 | A | 6/1981 | Keller | |
| 4,325,177 | A | 4/1982 | DePoorter | |
| 4,563,144 | A * | 1/1986 | Rose | 425/166 |
| 4,912,902 | A | 4/1990 | Weaver | |
| 5,624,615 | A | 4/1997 | Sandorff | |
| 5,637,236 | A | 6/1997 | Lowe | |
| 5,728,333 | A * | 3/1998 | Tabata et al. | 264/46.4 |
| 5,787,666 | A | 8/1998 | Sherry | |
| 6,106,264 | A * | 8/2000 | Stenekes | 425/145 |
| 6,129,329 | A | 10/2000 | Nasvik | |
| 6,412,244 | B2 | 7/2002 | Nolan | |
| 2001/0047631 | A1 | 12/2001 | Nolan | |
| 2004/0070106 | A1 | 4/2004 | Harrington | |

FOREIGN PATENT DOCUMENTS

| | | |
|---|---|---|
| CA | 1166864 | 5/1984 |
| CA | 1200133 | 2/1986 |
| CA | 1272410 | 8/1990 |
| CA | 2049070 | 10/1990 |
| CA | 1276494 | 11/1990 |
| CA | 1280020 | 2/1991 |
| CA | 1280926 | 3/1991 |

(Continued)

*Primary Examiner* — Timothy L Maust
(74) *Attorney, Agent, or Firm* — Goudreau Gage Dubuc; Gonzalo Lavin

(57) ABSTRACT

A molding tray and system for making molded structures using a moldable material. The molding tray includes an outer tray and a resilient inner mold fitted therein. The outer tray includes a hole in a bottom wall thereof to provide access to a bottom face of the inner mold such that pressure may be applied to the bottom face through the hole so as to dislodge a molded structure.

2 Claims, 14 Drawing Sheets

FOREIGN PATENT DOCUMENTS

| | | | |
|---|---|---|---|
| CA | 1301519 | | 5/1992 |
| CA | 2036271 | | 1/1995 |
| CA | 2181029 | | 7/1995 |
| CA | 2161120 | | 8/1995 |
| CA | 2203830 | | 3/1997 |
| CA | 2203720 | | 10/1998 |
| CA | 2355107 | | 6/2000 |
| EP | 0 289 643 | | 11/1988 |
| EP | 0629754 | | 12/1994 |
| EP | 0 984 118 | A2 | 3/2000 |
| JP | 10195894 | | 7/1998 |
| JP | 2000120248 | A | 4/2000 |
| WO | WO 95/19475 | | 7/1995 |
| WO | WO 99/22091 | | 5/1999 |
| WO | WO 2004/033799 | | 4/2004 |

* cited by examiner

APPARATUS AND METHOD FOR MAKING COBBLE-LIKE BLOCKS

FIELD OF THE INVENTION

The present invention relates to the fabrication of cobble-like blocks and more specifically to an automated apparatus and method for making molded cobble-like blocks.

BACKGROUND OF THE INVENTION

Molded cobble-like blocks or stones are commonly used in the fabrication of walls, paths and landscaping structures. These blocks are generally fabricated by molding cement or other such materials in various shapes and configurations and, once settled and dried, assembled by a mason or other such stoneworker in various structures.

However, apparatus and methods for making these blocks generally require significant manpower to ensure a proper molding of the blocks, that is, to provide various smoothing and finishing touches to the wet and/or drying cement blocks to minimize unwanted defects and reduce a number of misshaped products.

SUMMARY OF THE INVENTION

In order to address the above and other drawbacks of known techniques, it is an aim of the present invention to provide an automated method for making cobble-like blocks.

It is also an aim of the present invention to provide an automated system for making same.

More specifically, in accordance with the present invention, there is provided a method of filling a mold with a moldable material in a process for making molded structures, the method providing a substantially smooth finish to the material at an open surface of the mold, the method comprising the steps of:

a) providing a material feeder comprising a feeder opening, the feeder opening comprising at least one door, the door being displaceable in a plane substantially parallel to the opening;
b) positioning the open surface of the mold against and substantially parallel to the door;
c) opening the door to release the material into the mold;
d) closing the door once the mold is filled; and
e) implementing a relative displacement between the open surface of the mold and the door in the plane, thereby smoothing the material at the open surface of the mold.

Also in accordance with the present invention, there is provided an apparatus for making at least one molded structure using a mold and a moldable material, the apparatus comprising a feeder having a feeder opening and a mold support for supporting the mold at the opening, the opening comprising an inner door and an outer door displaceable in a plane substantially parallel to the opening, a combined activation of the doors controlling a flow of the material from the feeder to the mold. When the mold has been filled and both the inner door and the outer door are closed, the outer door may be reopened to smooth the material at an open surface of the mold.

Further in accordance with the present invention, there is provided a molding tray for making at least one molded structure using a moldable material, the molding tray comprising a solid outer tray and a resilient inner mold fitted therein, the outer tray comprising at least one hole in a bottom face thereof providing access to a resilient bottom face of the inner mold such that an upward pressure may be applied to the bottom face of the inner mold through the hole.

Still further in accordance with the present invention, there is provided a system for making molded structures, the system comprising a molding station for filling successive molds with a moldable mixture, an input conveying system for conveying empty molds to the molding station and an output conveying system for conveying filled molds away from the molding station, the molding station comprising a mold feeder having a feeder opening and a mold support for positioning and supporting the molds at the opening during filling, the opening comprising an inner door and an outer door displaceable in a plane substantially parallel to the opening, a combined activation of the doors controlling a flow of the mixture from the feeder to the molds. When the molds have been filled and both the inner door and the outer door are closed, the outer door may be reopened to smooth an open surface of the mixture in the mold.

Other aims, objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

Figure 1:
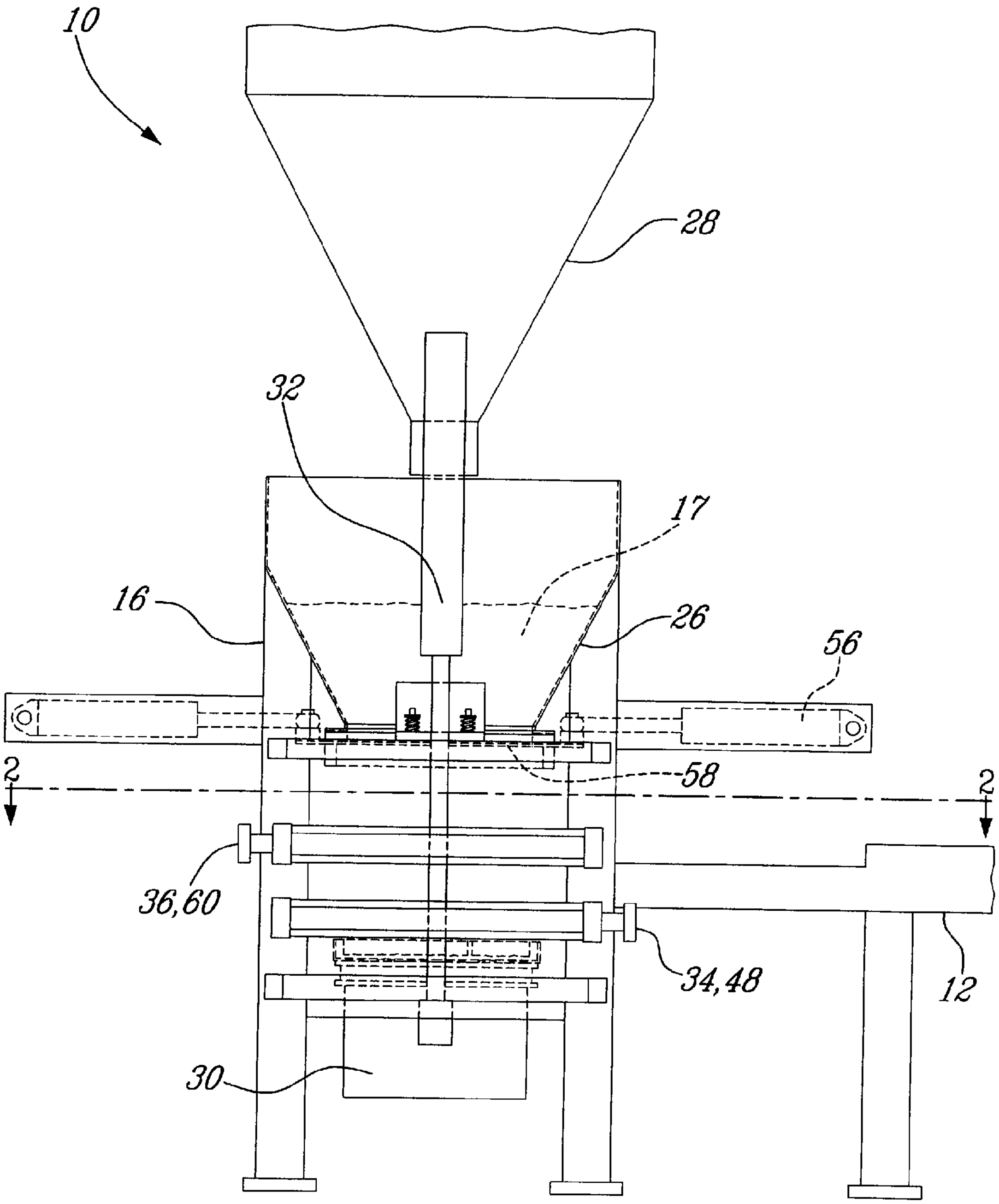
FIG. 1 is a side elevation view of an apparatus for making coble-like blocks in accordance with a first illustrative embodiment of the present invention.
Figure 2:
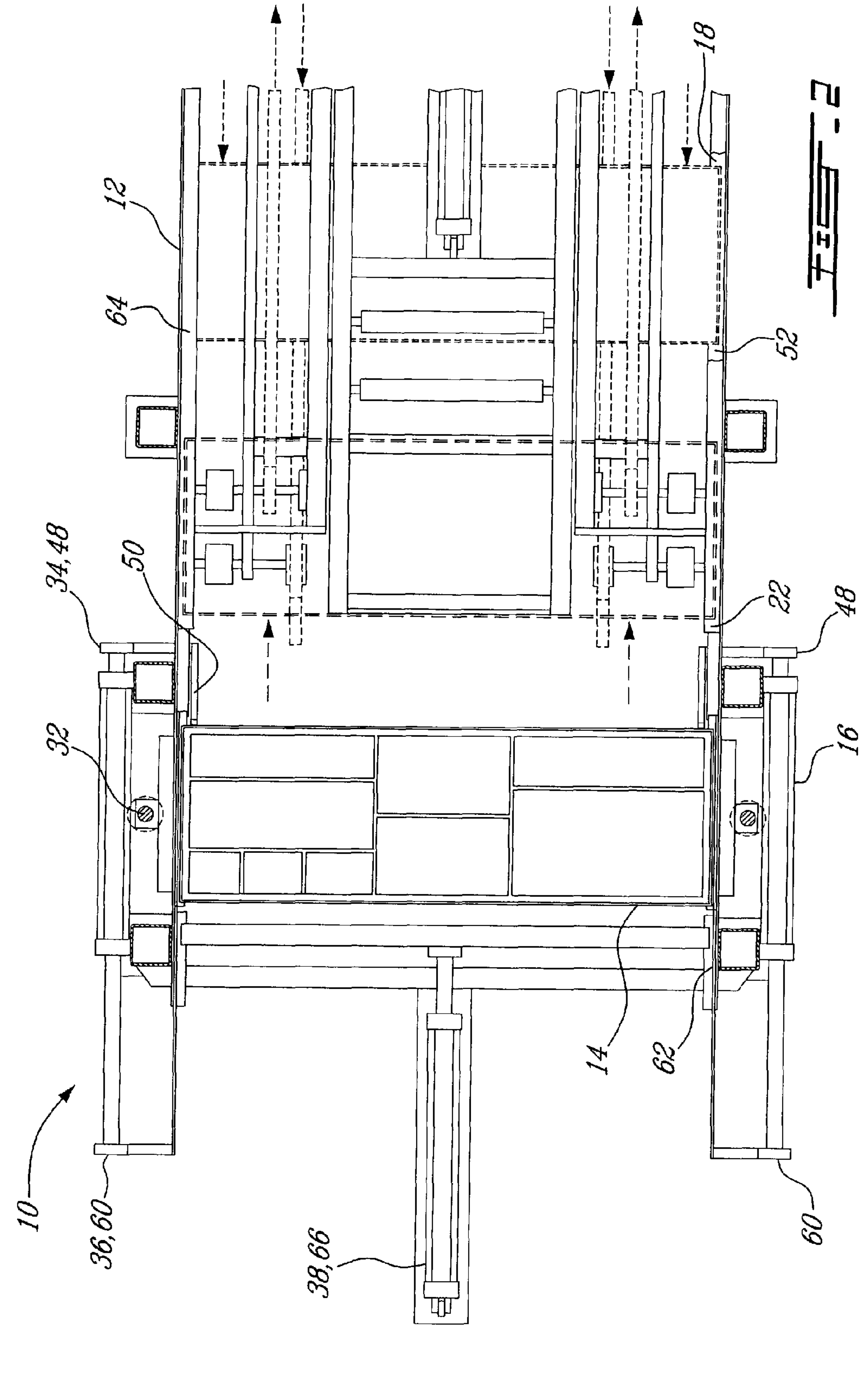
FIG. 2 is a cross-sectional view of the apparatus of FIG. 1 taken along line 2-2 thereof illustrating in dashed lines a travel of a molding tray for making the coble-like blocks during a process for making same.

Referring now to FIGS. 1 and 2, in accordance with a first illustrative embodiment of the present invention, an apparatus for making coble-like blocks, generally referred to using the numeral 10, will now be described. The apparatus 10 is generally comprised of a conveying system 12 operatively conveying a series of molding trays, as in 14, to and from a molding station 16 where the trays 14 are successively filled with a wet moldable material, such as cement mixture 17, for subsequent drying to produce the molded cobble-like blocks.

With particular reference to FIG. 2, the conveying system 12 is comprised of an input conveyer 18 (see FIG. 2) for conveying empty trays 14 to the molding station 16 and, an output conveyer 22, disposed above the input conveyer 18, for conveying filled trays 14 from the molding station 16 to a drying/curing station (not shown).

Referring back to FIGS. 1 and 2, the molding station 16 is generally comprised of a feeding tub 26, a funneled vat 28 for filling the tub 26 with the wet cement mixture 17, a vibrating platform 30 vertically displaceable by hydraulics 32 between tray loading, feeding and unloading positions, and a series of hydraulically actuated means 34, 36 and 38 for loading and unloading the trays 14 between the vibrating platform 30, the input conveyer 18 and the output conveyer 22.

Figure 3:
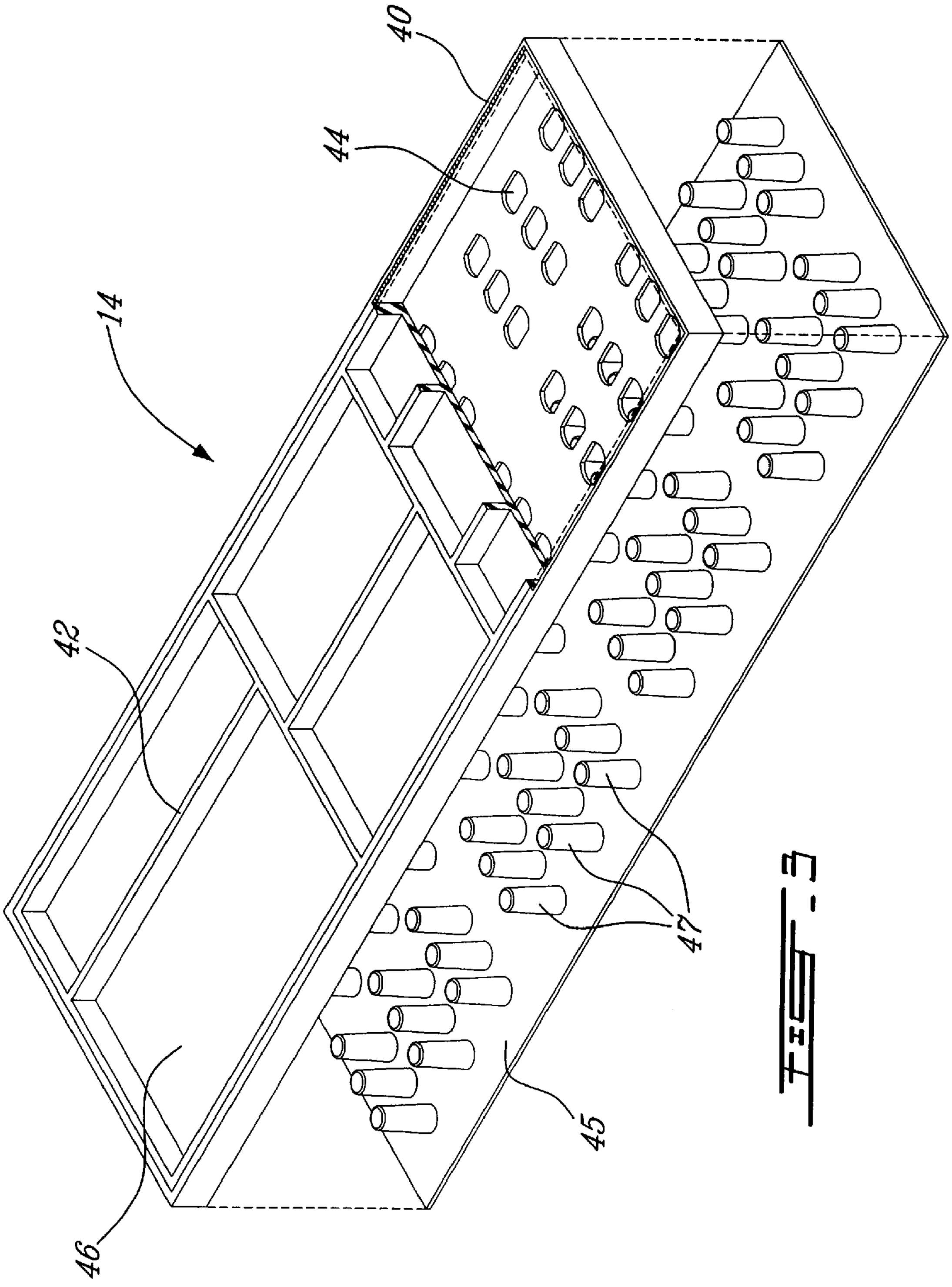
FIG. 3 is a perspective view of the molding tray of FIG. 2 illustrating, via a fragmentary view, a partial section of an inner mold thereof.

Referring now to FIG. 3, a molding tray 14 for use with apparatus 10 is generally comprised of an outer tray 40 and an inner mold 42 fitted therein to provide an illustratively flush upward surface at a outer tray—inner mold juncture. In particular, the outer tray 40 is manufactured of a solid material such as metal or steel and is perforated to present an number of holes 44 at a bottom thereof. The inner mold 42 is generally manufactured of plastic or rubber and is fitted in the outer tray 40. The inner mold 42 is generally comprised of a number of compartments 46 configured to provide corresponding cobble-like blocks or stones, herein of various sizes and shapes. A bottom surface of the compartments 46 may be textured or profiled to provide an additional ornamental or aesthetic value to the resulting blocks.

The holes 44 of outer tray 40 are generally provided to facilitate both an alignment of the tray in the apparatus 10 (discussed further hereinbelow) and a dislodging and removal of the formed blocks from the inner mold 42. In particular, an extraction platform 45 comprising a number of digits or elongated protuberances 47 configured to correspond to the holes 44 (i.e. aligned therewith), may be used to dislodge and initiate an extraction of the formed blocks from the outer tray 40. For instance, a downward pressure may be applied to a periphery of the outer tray 40 while the tray 14 rests on the extraction platform 45. As such, the digits 47 extend through the holes 44 and apply a dislodging pressure therethrough to the bottom face of the inner mold 42, pushing and ultimately dislodging the formed blocks therefrom. A suction and/or transport system may then take the formed blocks out of the mold 42 for storage and/or further processing.

In an optional embodiment, the entire system of outer tray 40 and inner mold 42 and extraction platform 45 all shown in FIG. 3, can be inverted upside down so that the extraction platform is placed above the system of outer tray and inner mold 42. This way, the digits 47 point downward and extend through holes 44 and apply a downward pressure to the bottom face of the mold 42. This arrangement is more efficient since gravity helps to dislodge the formed blocks from the mold 42. In addition, the dislodged blocks fall to a support platform (not shown) on their flattened side and are ready for curing.

Thus, in general operation, an empty tray 14 is brought to the molding station 16 by input conveyer 18. At this point, the vibrating platform 30 is at a vertical position below that of the input conveyer 18 such that the tray 14 may be positioned over the vibrating platform by the hydraulically actuated means 34. For example, a pair of hydraulic cylinders 48, initially extended to await the arrival of the incoming tray 14, may be operatively coupled to a pair of corresponding hooks 50 positioned along and within guide rails 52 of the input conveyer 18. As the tray is brought to the molding station 16 by the input conveyer 18, it is thereby pushed over these hooks 50 such that a subsequent actuation of the hydraulic cylinders 48 pulls the tray 14 along the rails 52 over the lowered vibrating platform 30.

Once the tray 14 is positioned above the platform 30, the platform 30 is raised by the hydraulic cylinders 32 coupled thereto thereby engaging the empty tray 14 and raising same to the mouth of the feeding tub 26. A set of protuberances (see reference 116 in FIG. 4A) may be provided on a top face of the platform 30 to engage the holes 44 at the bottom of outer tray 40, thereby increasing an alignment of the empty tray 14 at the mouth of the feeding tub 26.

Note that the coupling of the cylinders 32 and platform 30 is specifically adapted to allow a vertical displacement thereof without being obstructed by the rails 52. For instance, the cylinders 32 may be coupled to the platform 30 via a U-shaped structure (not shown) adapted to accept the rails 52 therein as the platform 30 is raised beyond a level thereof. Other such configurations should be readily apparent to a person of skill in the art.

In a subsequent step, a set of hydraulic cylinders 56 are actuated to open a set of doors 58 at the mouth of the tub 26 such that the cement mixture 17 is released into the inner mold 42 of the tray 14. To promote a uniform distribution of cement within the mold 42, the vibration platform 30 is activated thereby vibrating the tray 14 as it fills with the cement mixture 17. An upward pressure may be applied by the platform 30 to the tray 14 during filling to avoid spillage and loss of materials.

Once the mold is full, the hydraulic cylinders 56 are used to close the doors 58, thereby sealing the tub 26. The filled tray 14 may then be lowered by the platform 30 to the level of the output conveyer 22 and released thereon using the hydraulically actuated means 36 and 38. In particular, a first set of hydraulic cylinders 60, operatively coupled to respective removable rail segments 62, are actuated to position the rail segments 62 below the filled tray 14 and operatively engage the segments 62 to corresponding output conveyer rail 64. As such, the tray 14 may be lowered by the platform 30 and rested on the rail segments 62. A hydraulically actuated arm 66 (FIG. 2) then slides the tray 14 onto the output conveyer 22 over the connected rails 62, 64 to be removed thereby and brought to a subsequent station for further processing, curing and/or drying. The platform 30 may then proceed to pick-up a new tray 14 from the input conveyer 18. As the rail segments 62 recede, the process may be repeated with the new tray 14.

One such post-processing step may include providing finishing touches to the molded mixture. For instance, as the tray 14 is lowered from the tub 26, some of the mixture may adhere to the closed doors 58 and thus provide an uneven block surface at the open face of the mold 42. As such, various manual smoothing steps may be applied to the blocks including manually smoothing the block surface using a trowel or the like.

Figure 4A:
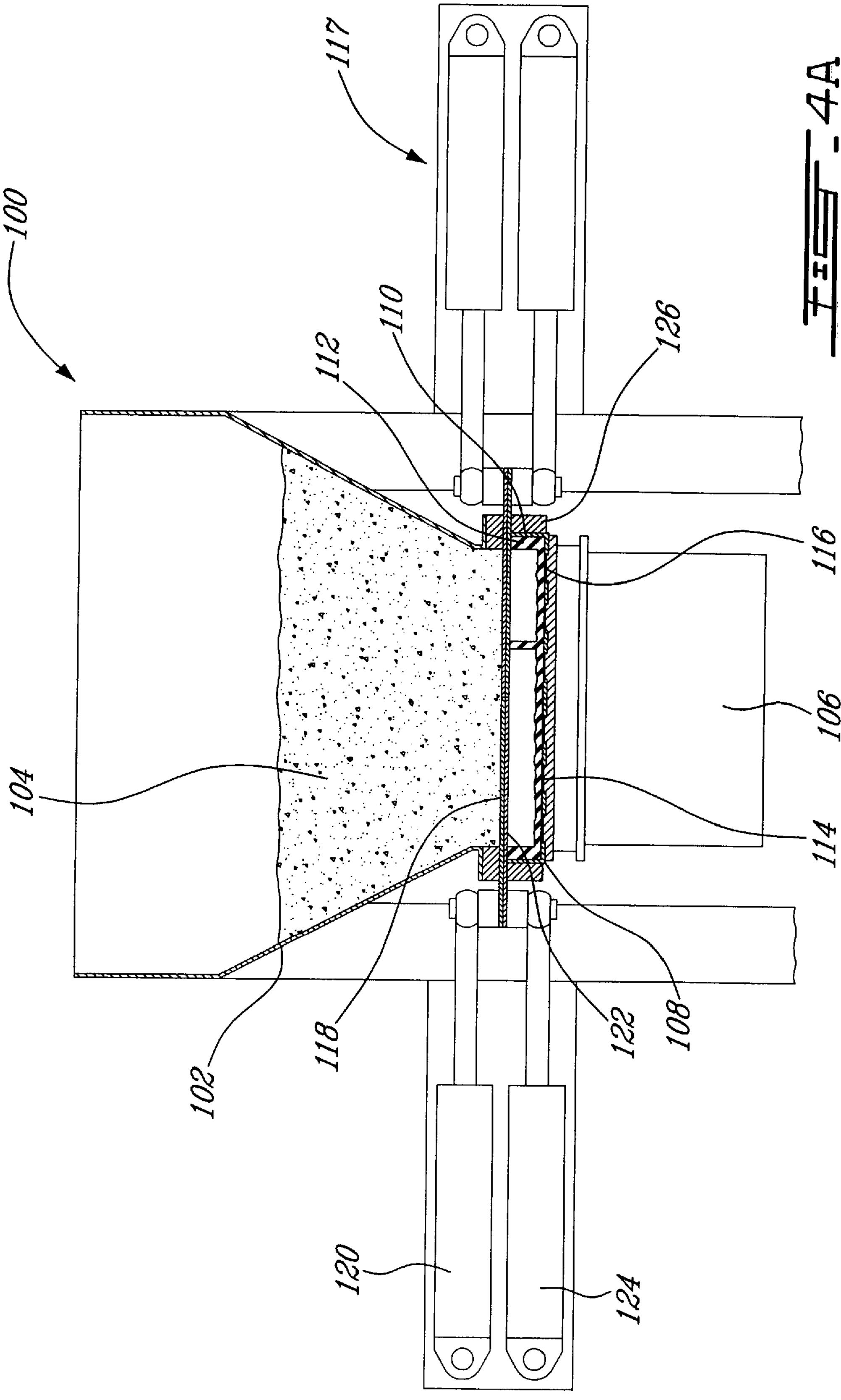
FIGS. 4A to 4E are side elevation views of an upper section of the apparatus of FIG. 1, modified to include a double tub door system, illustrating in five successive steps a process for making the coble-like blocks in accordance with a second illustrative embodiment of the present invention.

Referring now to FIGS. 4A to 4E, an alternative apparatus 100, in accordance with a second illustrative embodiment of the present invention, provides a solution to this particular situation. In FIG. 4A, the modified molding station 100 is again illustratively comprised of a feeding tub 102 containing a cement mixture 104 therein and, a vibration platform 106 hydraulically actuated to move a molding tray 108 to and from a mouth of the tub 102. The molding tray 108 is again comprised of an outer tray 110 and an inner mold 112, the outer tray 110 again comprising a series of holes 114 in a bottom wall thereof to accept therein a number of corresponding protuberances 116 located on a top face of the vibration platform 106 and to facilitate a removal of the formed blocks using an extraction platform, as described hereinabove.

The molding station is further comprised of a double tub door system 117 comprised of an upper set of doors 118 hydraulically actuated by a first set of hydraulics 120 and, a lower set of doors 122 hydraulically actuated by a second set of hydraulics 124. When the empty tray is brought up to the tub 102, both sets of doors 118, 122 are shut (FIG. 4A). The tray 108 is received at the tub 102 within a feeding bay comprised of peripheral walls 126 encasing the outer tray 110. The sliding doors 118, 122 are adapted to slide through a slit in the peripheral wall 126, possibly on a track and/or guiding support system (not seen), such that a bottom face of the bottom doors 122 comes in close contact with the open face of the mold 112.

Figure 4B:
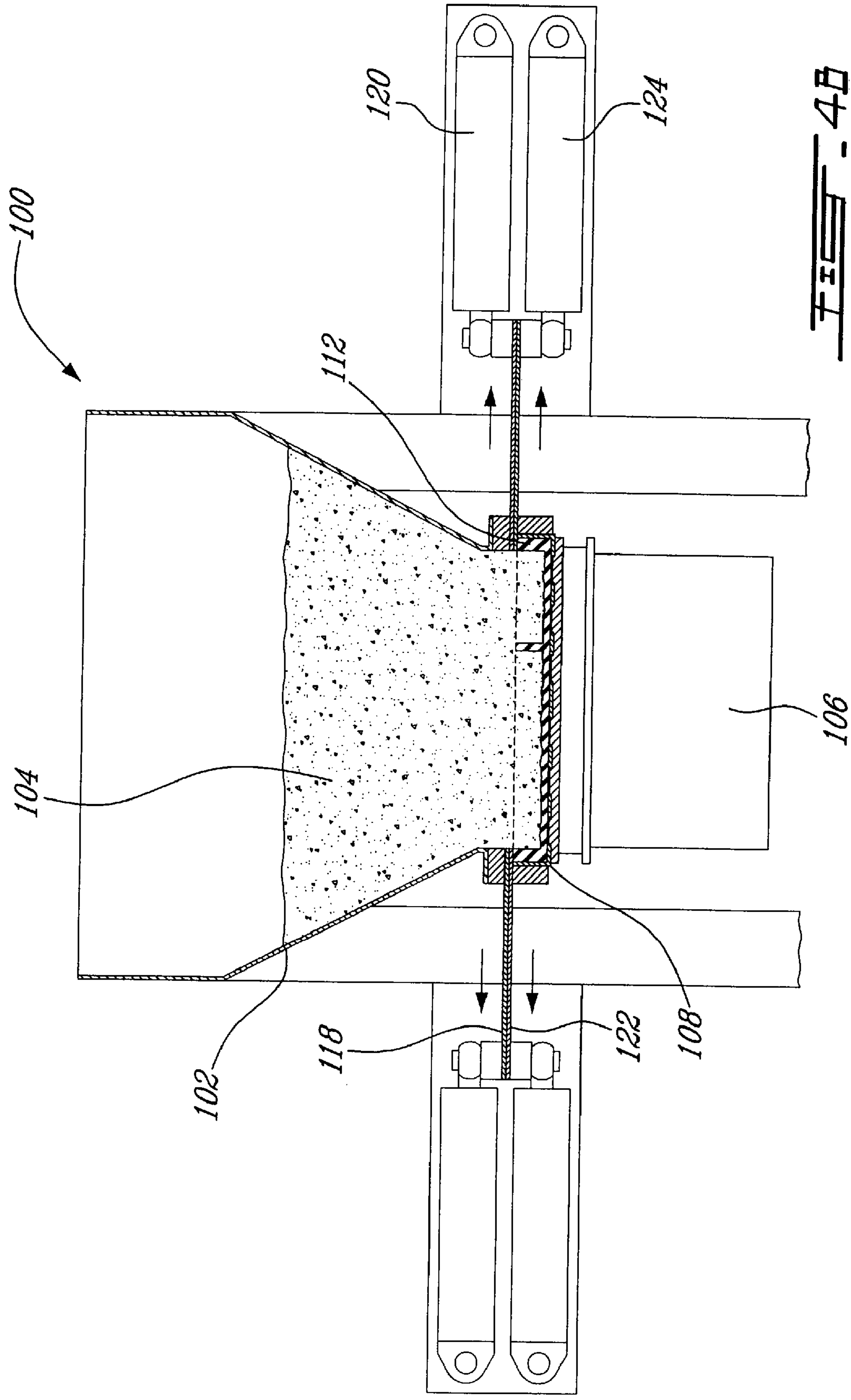
Figure 4C:
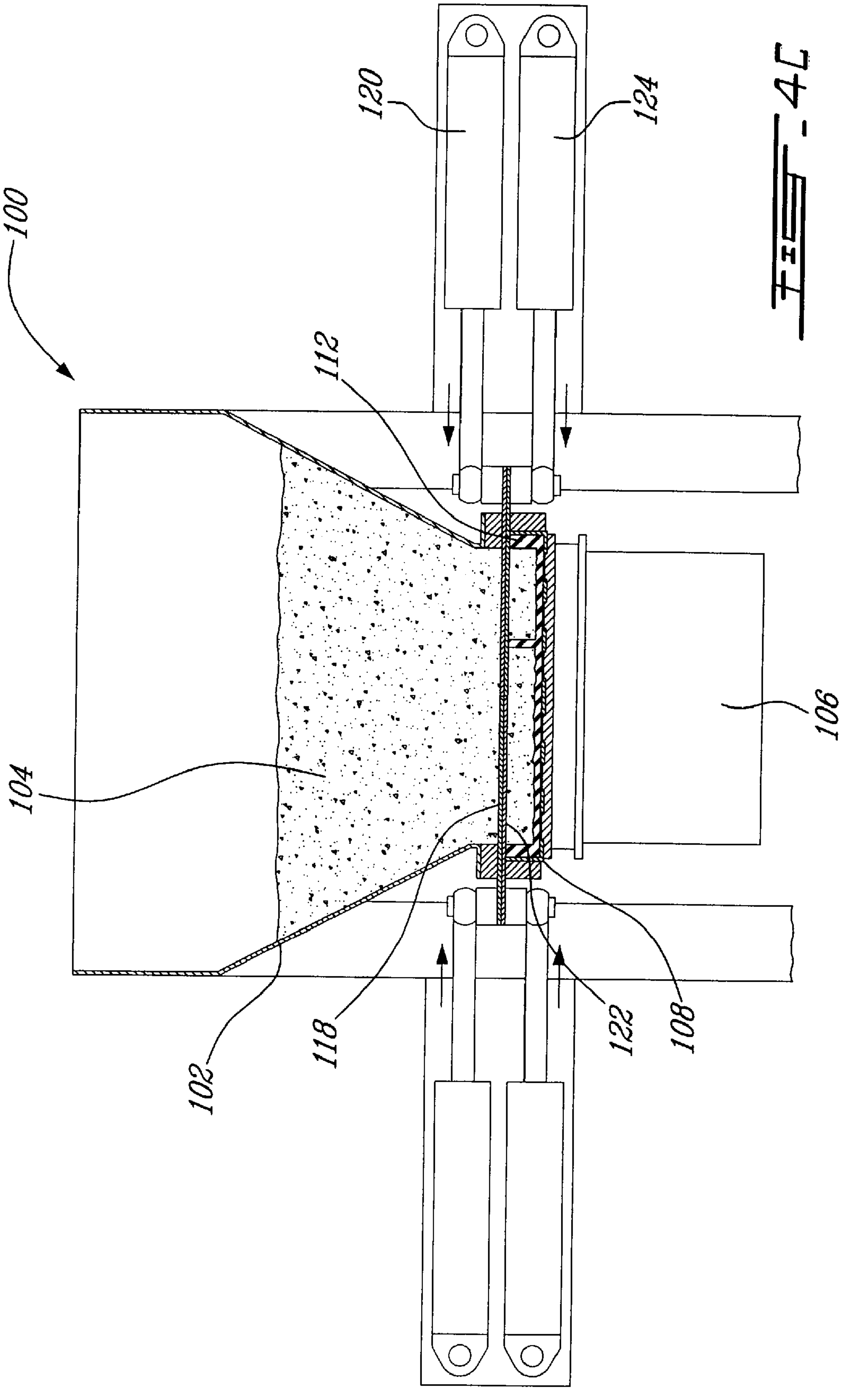
Figure 4D:
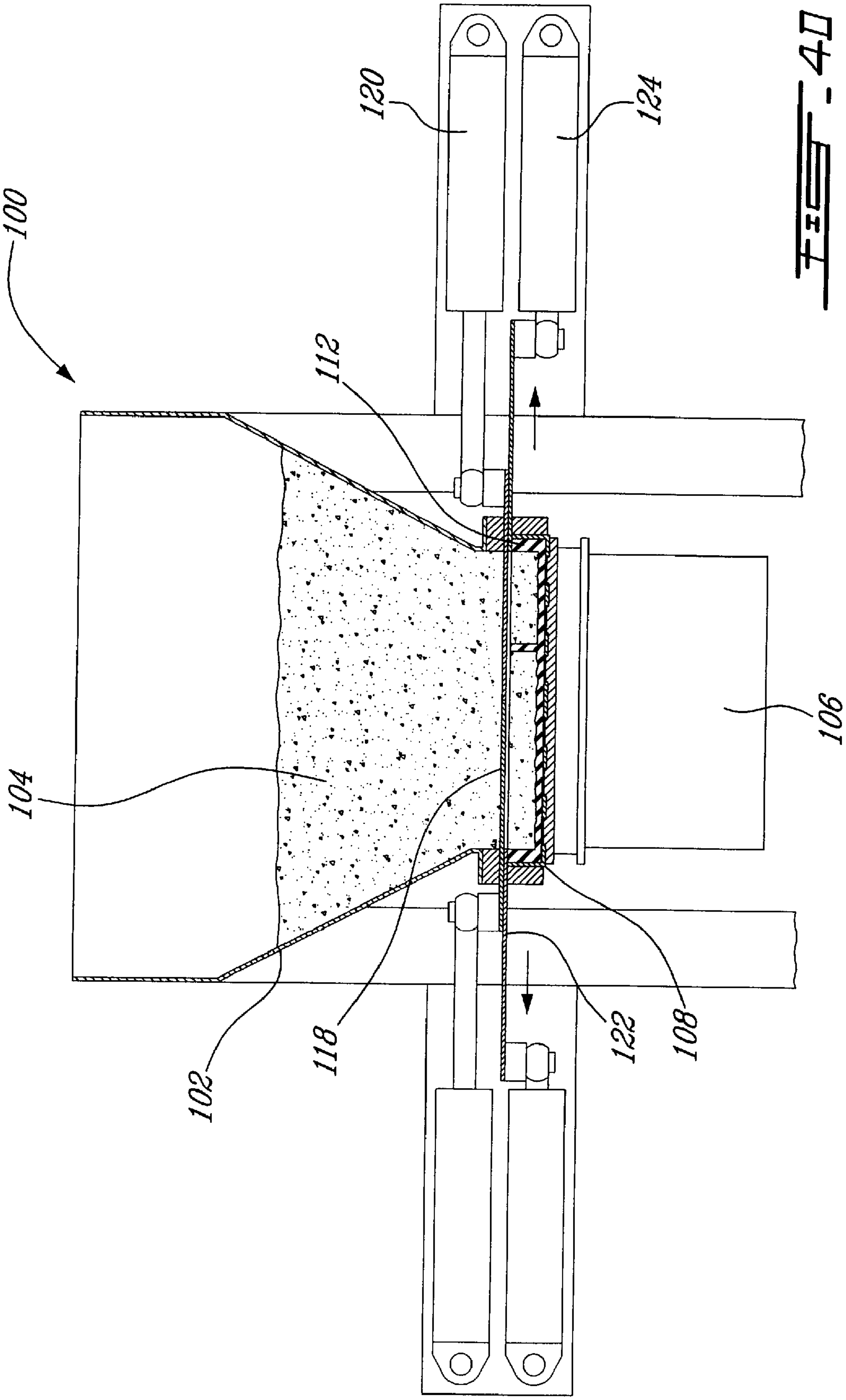

In FIG. 4B, both sets of doors 118, 122 are opened to release the cement mixture 104 into the mold 112. The vibration platform 106 again agitates the molding tray 108 thereby promoting a uniform distribution of cement throughout the mold 112.

Once the mold 112 is full, both sets of doors 118,122 are shut (FIG. 4C) thereby sealing the tub 102.

The lower set of doors 122 are then reopened (FIG. 4D) illustratively wiping cement adhered thereto on the open face of the mold 112 thereby leaving behind a substantially smooth cement surface at this open face. Note that the upper doors 118 are still shut, thereby inhibiting a further flow of cement from the tub 102 to the tray 108. The reopening of the lower set of doors 122 creates a space or gap between the cement and the closed upper set of doors 118, which allows the molding tray 108 to subsequently lower without suction with respect to the tub 102, thereby minimizing, if not eliminating, any deformation of the facing surface of the cement.

Figure 4E:
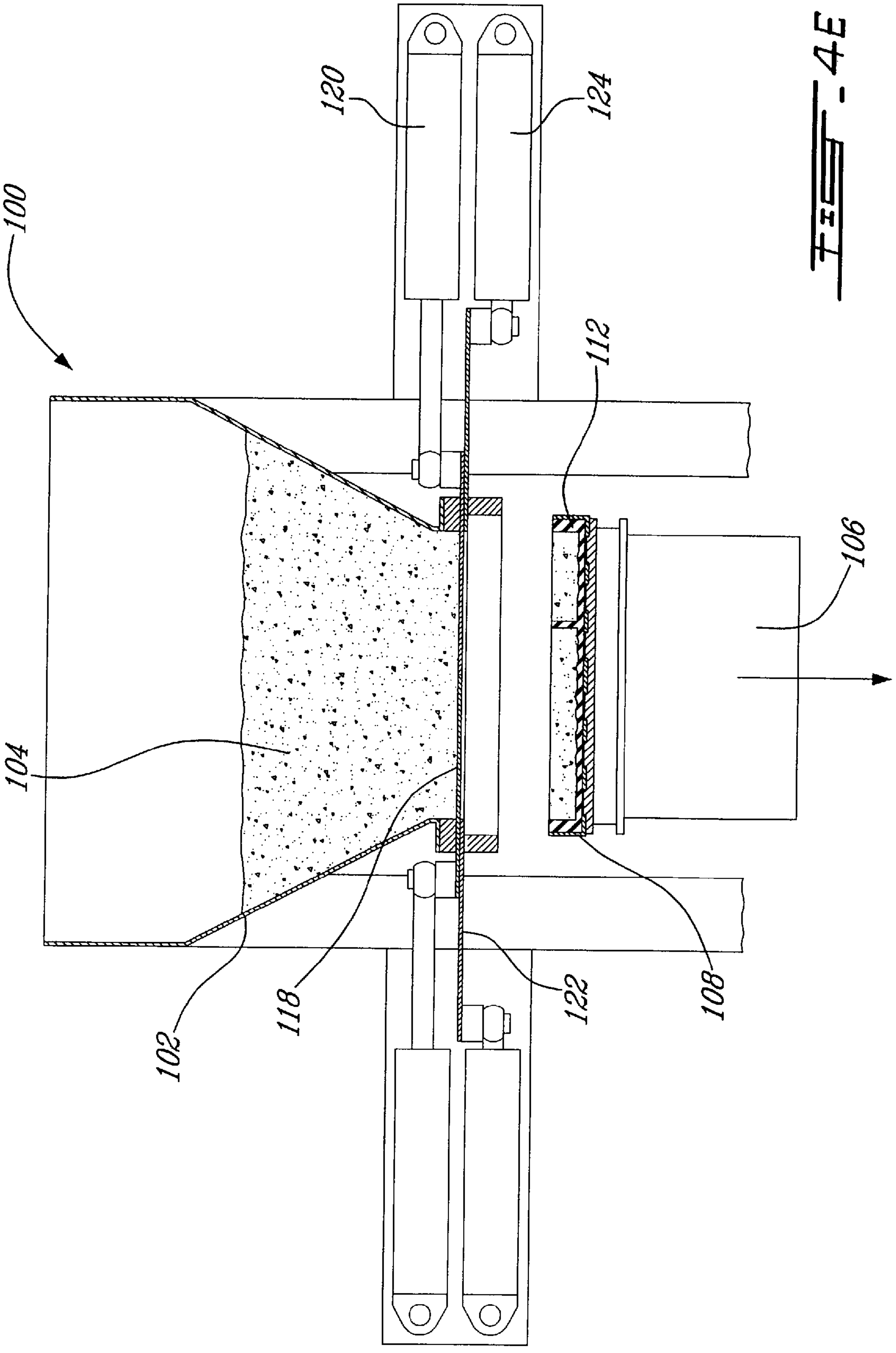

In FIG. 4E, the tray 108 is lowered and brought back to an associated conveying system (not shown) for further processing, curing and/or drying. Using this technique, the need for subsequent smoothing or finishing touches to the drying blocks is reduced (if not eliminated), the upper surface of which being generally smoothed by the sliding movement of the lower doors 122 in the step illustrated in FIG. 4D.

Figure 5A:
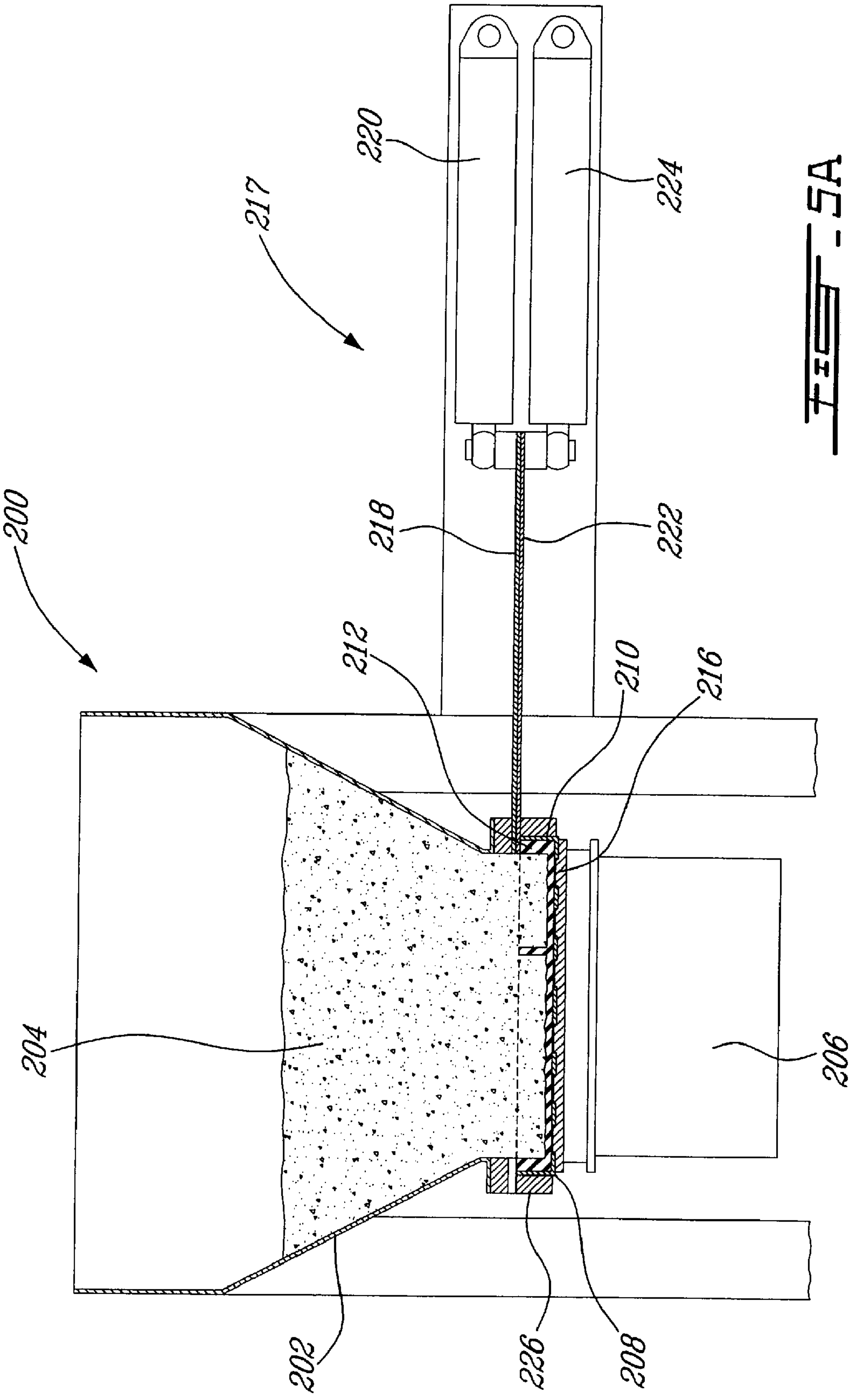
FIGS. 5A to 5C are side elevation views of an upper section of the apparatus of FIG. 1, modified to include a double tub door system, illustrating in three successive steps a process for making the cobble-like blocks, in accordance with a third illustrative embodiment of the present invention.
Figure 5B:
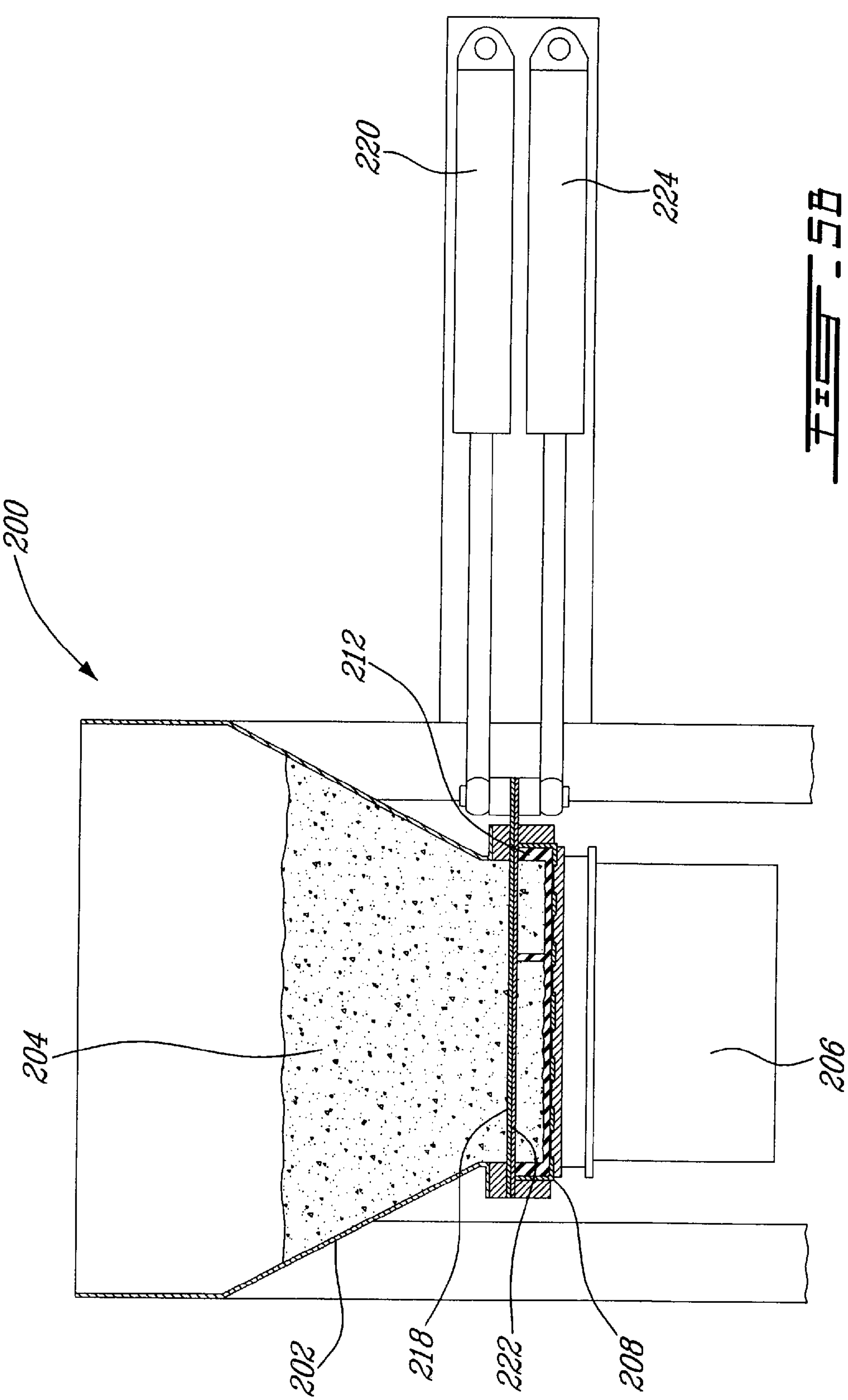
Figure 5C:
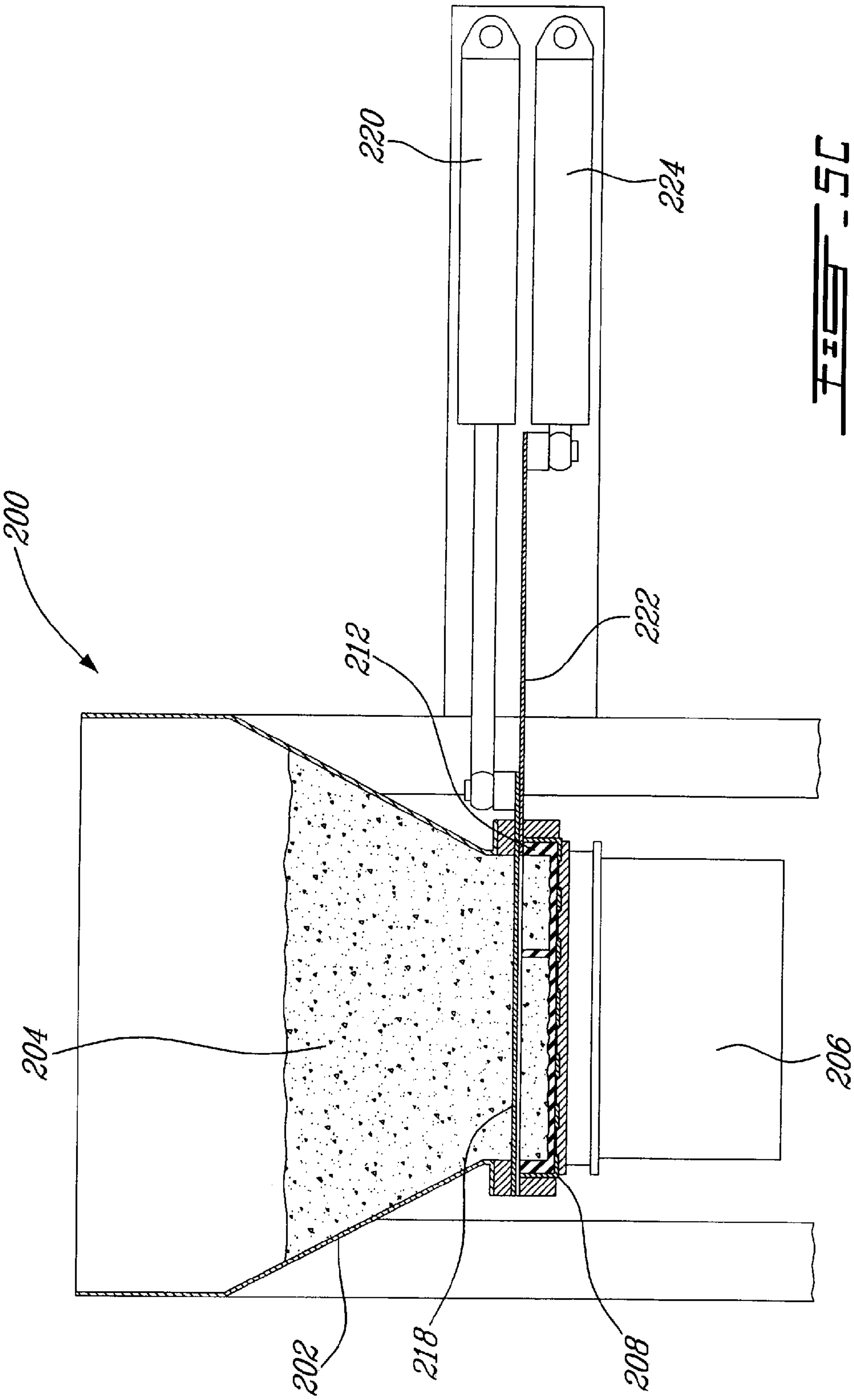

Referring now to FIGS. 5A to 5C, an alternatively modified molding station 200 is presented in accordance with a third illustrative embodiment of the present invention. In FIG. 5A, the molding station 200 is again illustratively comprised of a feeding tub 202 containing a cement mixture 204 therein and, a vibration platform 206 hydraulically actuated to move a molding tray 208 to and from a mouth of the tub 202. The molding tray 208 is again comprised of an outer tray 210 and an inner mold 212, the outer tray 210 again comprising a series of holes 214 in a bottom wall thereof to accept therein a number of corresponding protuberances 216 located on a top face of the vibration platform 206 and to facilitate a removal of the formed blocks using an extraction platform, as described hereinabove.

The molding station is further comprised of a double tub door system 217, in this embodiment comprised of an upper door 218 hydraulically actuated by a first hydraulic cylinder 220 and, a lower door 222 hydraulically actuated by a second hydraulic cylinder 224. When the empty tray is brought up to the tub 202, both doors 218, 222 are shut. The tray 208 is again received at the tub 202 within a feeding bay comprised of peripheral walls 226 encasing the outer tray 210. The sliding doors 218, 222 are adapted to slide through a slit in the peripheral wall 226, possibly on a track and/or guiding support system (not seen), such that a bottom face of bottom door 222 comes in close contact with the open face of the mold 212.

In FIG. 5A, both doors 218, 222 are open to allow the cement mixture 204 to fill the mold 212. The vibration platform 206 is again activated to agitate the molding tray 208 thereby promoting a uniform distribution of cement throughout the mold 212.

Once the mold 212 is full, both sets of doors 218, 222 are shut (FIG. 5B) thereby sealing the tub 202.

The lower door 222 is then reopened (FIG. 5C) illustratively wiping cement adhered thereto on the open face of the mold 212 thereby leaving behind a substantially smooth cement surface at this open face. Again note that the upper door 218 is still shut, thereby inhibiting a further flow of cement from the tub 202 to the tray 208.

The tray 208 may then be lowered and brought back to an associated conveying system (not shown) for further processing or drying. As above, this technique also reduces the need for subsequent smoothing or finishing touches to the drying blocks, this time thanks to the sliding motion of the single lower door 222, as illustrated in FIG. 5C.

Figure 6A:
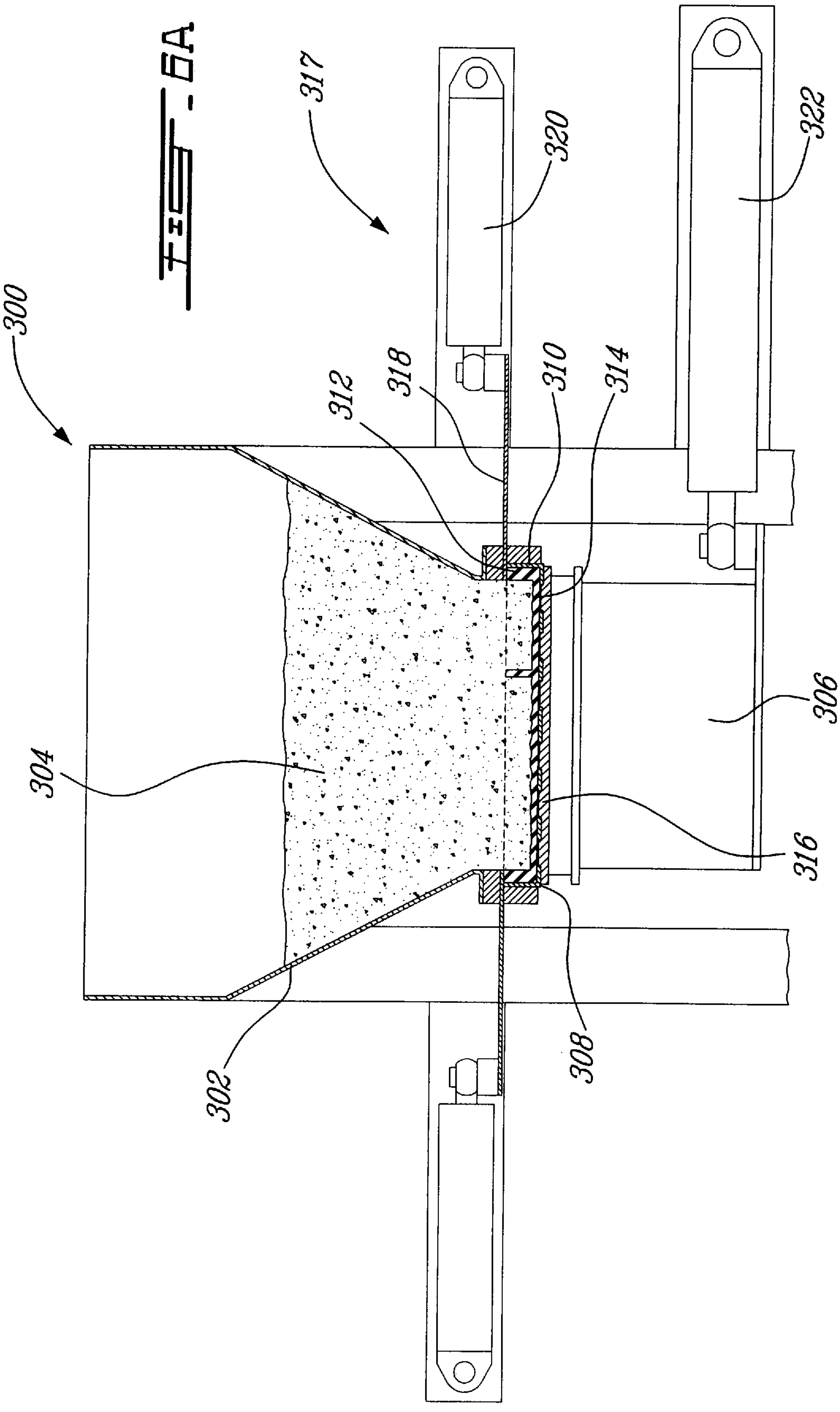
FIGS. 6A to 6C are side elevation views of an upper section of the apparatus of FIG. 1, modified to include a laterally displaceable molding platform, illustrating in three successive steps a process for making the cobble-like blocks in accordance with a fourth illustrative embodiment of the present invention.
Figure 6B:
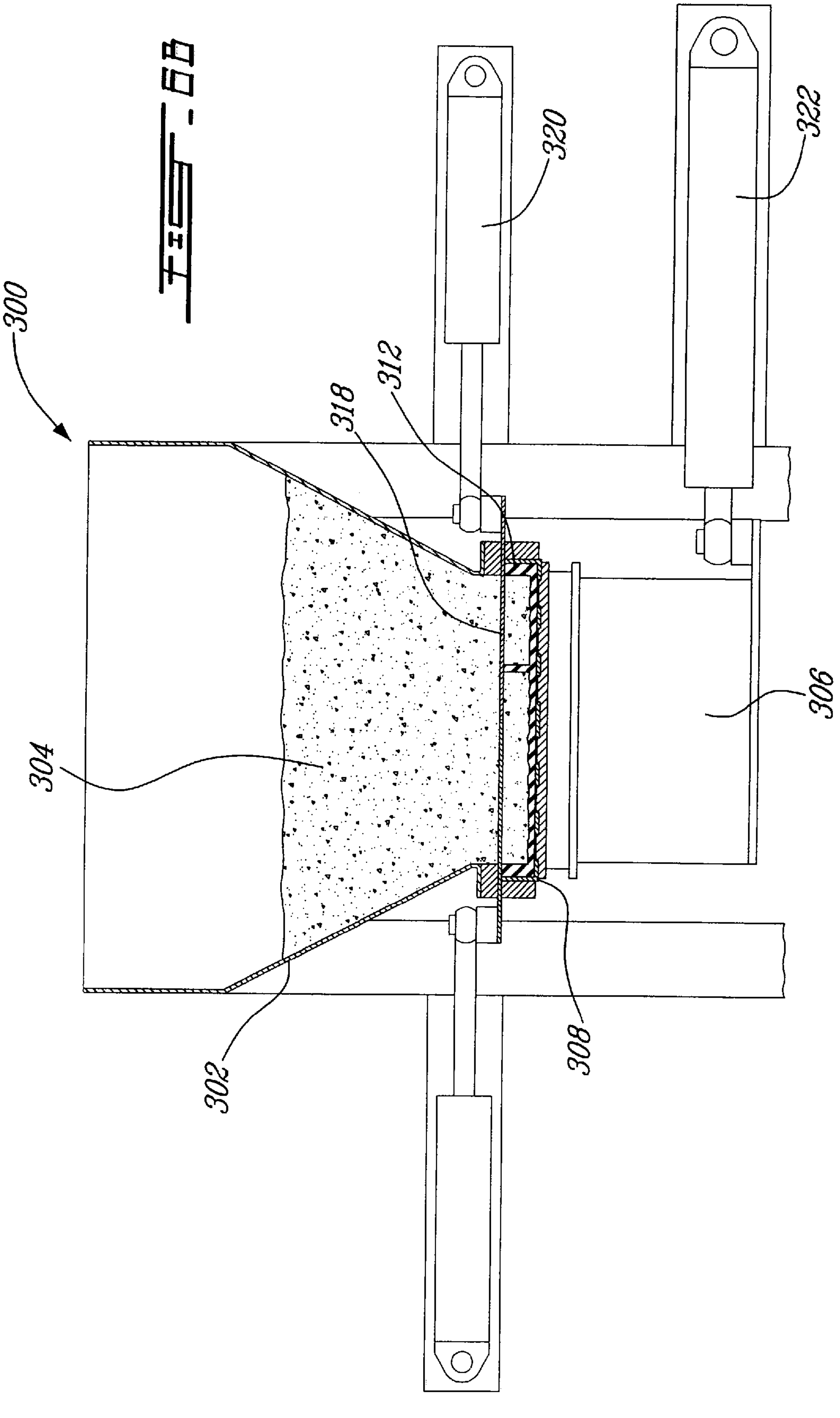
Figure 6C:
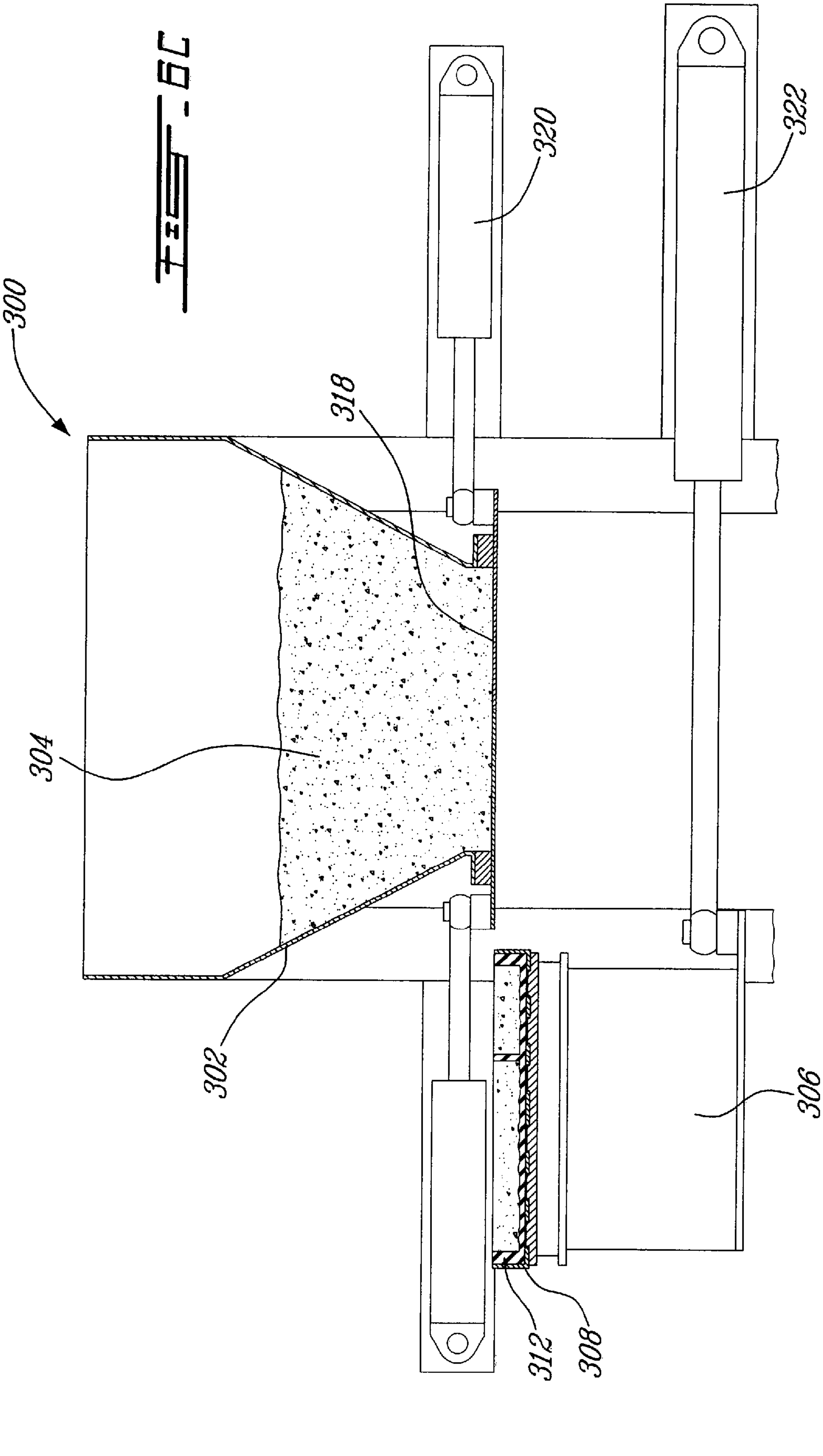

Referring now to FIGS. 6A to 6C, a further alternatively modified molding station 300 is presented in accordance with a fourth illustrative embodiment of the present invention. In FIG. 6A, the molding station 300 is again illustratively comprised of a feeding tub 302 containing a cement mixture 304 therein and, a vibration platform 306 hydraulically actuated to move a molding tray 308 to and from a mouth of the tub 302. The molding tray 308 is again comprised of an outer tray 310 and an inner mold 312, the outer tray 310 again comprising a series of holes 314 in a bottom wall thereof to accept therein a number of corresponding protuberances 316 located on a top face of the vibration platform 306 and to facilitate a removal of the formed blocks using an extraction platform, as described hereinabove.

In this embodiment however, the molding station may only be comprised of a single tub door system 317, illustrated here as a set of sliding doors 318 hydraulically actuated by a set of hydraulics 320. The vibration platform 306 is however also adapted to be hydraulically displaced laterally by a hydraulic cylinder 322.

When the empty tray is brought up to the tub 302, the doors 318 are shut. The tray 308 is received at the tub 302 below the sliding doors 318. These doors 318 are adapted to slide, possibly on a track and/or guiding support system (not seen), such that a bottom face of the doors 318 comes in close contact with the open face of the mold 312.

In FIG. 6A, the doors 318 are open to allow the cement mixture 304 to fill the mold 312. The vibration platform 306 is again activated to agitate the molding tray 308 thereby promoting a uniform distribution of cement throughout the mold 312.

Once the mold 312 is full, the doors 318 are shut (FIG. 6B) thereby sealing the tub 302.

In FIG. 6C, the hydraulic cylinder 322 is actuated to slide the platform 306 sideways, illustratively smoothly wiping the open face of the filled mold 312 against the doors 318 thereby providing a smooth cement surface at this open face.

The platform 306 and tray 308 may then be lowered and brought back to an associated conveying system (not shown) for further processing or drying. As above, this technique also reduces the need for subsequent smoothing or finishing touches to the drying blocks, this time thanks to the sliding motion of the platform 306, as illustrated in FIG. 6C.

As can be seen from the above illustrative embodiments, significant improvements are provided by apparatus 10, 100, 200 and 300 in the filling and ultimate fabrication of molded cobble-like blocks. A person of skill in the art will understand that although the above discussion is focused on the manufacture of cement blocks, other types of moldable materials, to be formed in various sizes and shapes, may also be considered without extending the general scope and nature of the present disclosure.

Furthermore, various modifications to the disclosed apparatus may be considered to provide a similar effect. Namely, other types of doors and/or platforms may be considered. In one example, sliding tub doors may be replaced by one or plural rotating doors generally parallel to an opening of a feeding tub and rotating in a plane substantially parallel thereto. Alternatively, various other configurations of sliding and/or gliding doors may be considered and should be apparent to the person of skill in the art.

In addition, various mold configurations may be utilized in the present context to provide a variety of molded structures. Single or plural compartment molds may be manufactured in various shapes and sizes and adapted to be used with a correspondingly configured feeding tub.

Also, a person of skill in the art will readily understand that a number of conveying and feeding mechanisms and apparatus may be configured to automate the above process with minimal user intervention. For example, a number of conveyer configurations may be considered in the present context and should be apparent to the person of skill in the art.

Although the invention has been described with reference to certain specific embodiments, various modifications thereof will be apparent to those skilled in the art without departing from the spirit and scope of the invention as outlined in the claims appended hereto.

What is claimed is:

1. A system for making molded structures, the system comprising a molding station for filling successive molds with a moldable mixture, an input conveying system for conveying empty molds to said molding station and an output conveying system for conveying filled molds away from said molding station, said molding station comprising a mold feeder having a feeder opening and a mold support for positioning and supporting said molds at said opening during filling, said opening comprising an inner door and an outer door displaceable in a plane substantially parallel to said opening, a combined activation of said doors controlling a flow of the mixture from said feeder to said molds, wherein, when said molds have been filled and both said inner door and said outer door are closed, said outer door may be reopened to smooth an open surface of the mixture in the mold, wherein said successive molds each comprise a solid outer tray and a resilient inner mold fitted therein, said outer tray comprising at least one hole in a bottom wall thereof providing access to a resilient bottom face of said inner mold such that a pressure may be applied to said bottom face of said inner mold through said hole(s) so as to dislodge a molded material from filled molds, said system further comprising a station for unmolding molds that have been filled, said station comprising means for seizing said outer tray and inner mold while retractable members are moved to apply pressure to said bottom face of inner mold through said hole(s) so as to dislodge said molded material.

2. The system of claim 1, wherein the molded material is cement-based.

* * * * *